United States Patent [19]
Schmeller

[11] 3,882,320

[45] May 6, 1975

[54] TIDE ENERGY CONVERSION DEVICE

[76] Inventor: Edmund Schmeller, Chewelah, Wash. 99109

[22] Filed: Dec. 20, 1973

[21] Appl. No.: 409,013

[52] U.S. Cl.................................. 290/43; 290/54
[51] Int. Cl............................................ F03b 13/12
[58] Field of Search............ 290/52, 53, 54, 42, 43; 417/334, 335, 336, 330, 331, 332, 333

[56] References Cited
UNITED STATES PATENTS

| | | | |
|---|---|---|---|
| 618,148 | 1/1899 | Vance.................................. | 290/53 |
| 867,192 | 9/1907 | Dawson ............................... | 290/43 |
| 2,097,286 | 10/1937 | McGee ................................. | 290/54 |
| 2,179,537 | 11/1939 | Zoppa.................................. | 290/42 |

FOREIGN PATENTS OR APPLICATIONS

| | | | |
|---|---|---|---|
| 313,850 | 6/1956 | Switzerland......................... | 290/43 |

*Primary Examiner*—R. Simmons

[57] ABSTRACT

A tide energy conversion device including a plurality of spaced apart pairs of parallel endless channel members elongated in the direction of tide flow and facing each other. The members include lower flights that are substantially horizontal and straight. Roller frames, each having two pair of spaced apart rollers, one pair in each channel of a pair of channels, carry elongated blades extending outwardly and transversely of the channels. These blades are connected to the frames by brace arms, each extending diagonally from the frame to locations adjacent the outer edge of a blade, and by support arms, each connected to an edge of a blade. The channel members are supported on a base which is secured at a level that supports the blades so they are at least partially submerged in the water while they are carried beneath the channels. Endless chains connect the several roller frames. The chains extend over longitudinally-spaced sprockets rotatably mounted on shafts. Force of the tide flow against the movable blades rotates the shafts which are connected to electrical generators. Gear reduction and transmission means is provided to enable the generators to produce electricity regardless of the directional movement of the blades.

3 Claims, 7 Drawing Figures

3,882,320

3,882,320

TIDE ENERGY CONVERSION DEVICE

BACKGROUND OF THE INVENTION

The apparatus of the present invention relates basically to apparatus for producing electrical energy from directional flow of water and particularly to such devices utilized to produce electricity from the inward and outward flow of oceans tides.

It has recently become very desirable to design and construct energy conversion devices that do not consume natural resources and that will not pollute the atmosphere. These considerations have been partially realized by the development of hydroelectric dams constructed in the course of rivers and other waterways wherein a single directional flow of water exists. Obviously, the number of hydroelectric dams capable of being constructed is limited firstly by the number of available rivers or streams capable of supporting such structures and secondly, such structures require prescribed topographical conditions of the area surrounding the dam site.

An additional problem frequently incurred with such hydroelectric dams is that the amount of electricity to be generated is dependent directly on the amount of water capable of being stored behind the dam. Therefore, in times of drought or periods of substantially low water runoff, the generators are rendered unable to produce electricity at desired output levels.

It is therefore the purpose of the present invention to provide a practical means of utilizing the flow of water into and out of a bay or other area in response to rise and fall of the ocean tides which are not substantially effected by previous weather conditions.

If is a further object of my invention to provide a tide energy conversion device that will operate in response to incoming tide flow and, likewise to outgoing tide flow.

DETAILED DESCRIPTION OF A PREFERRED EMBODIMENT

Figure 1:
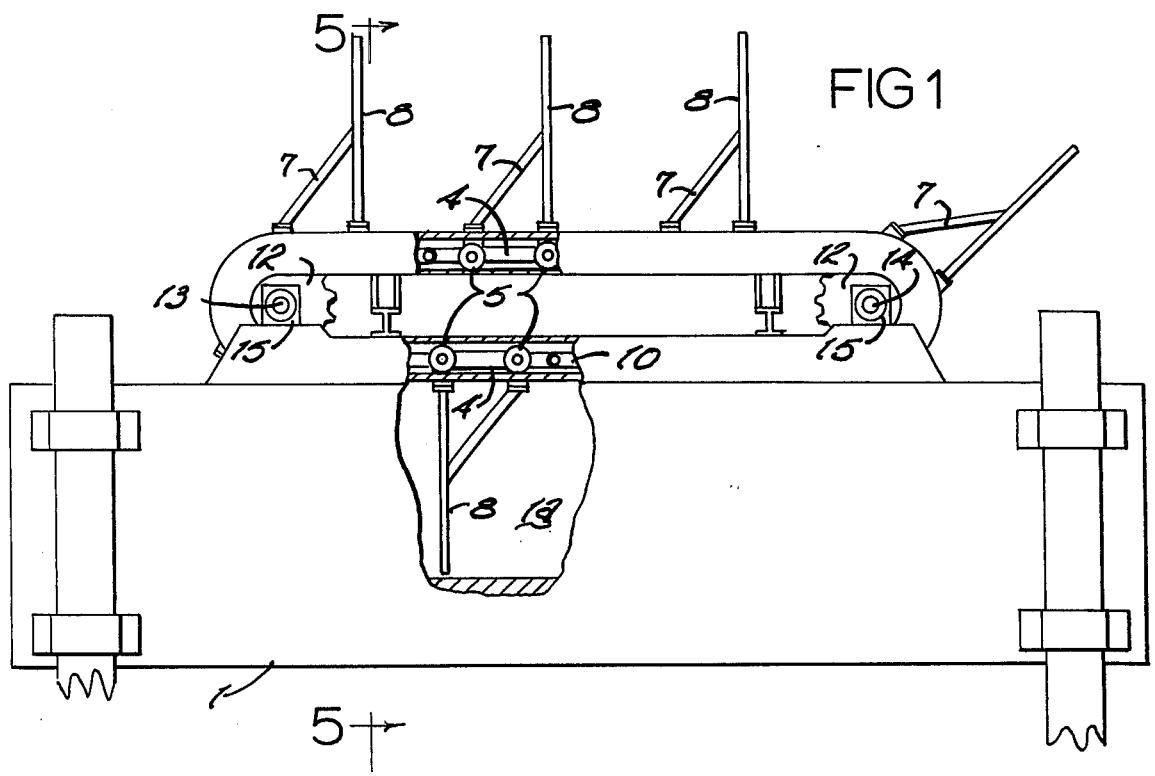
FIG. 1 is a side view of the device.
Figure 2:
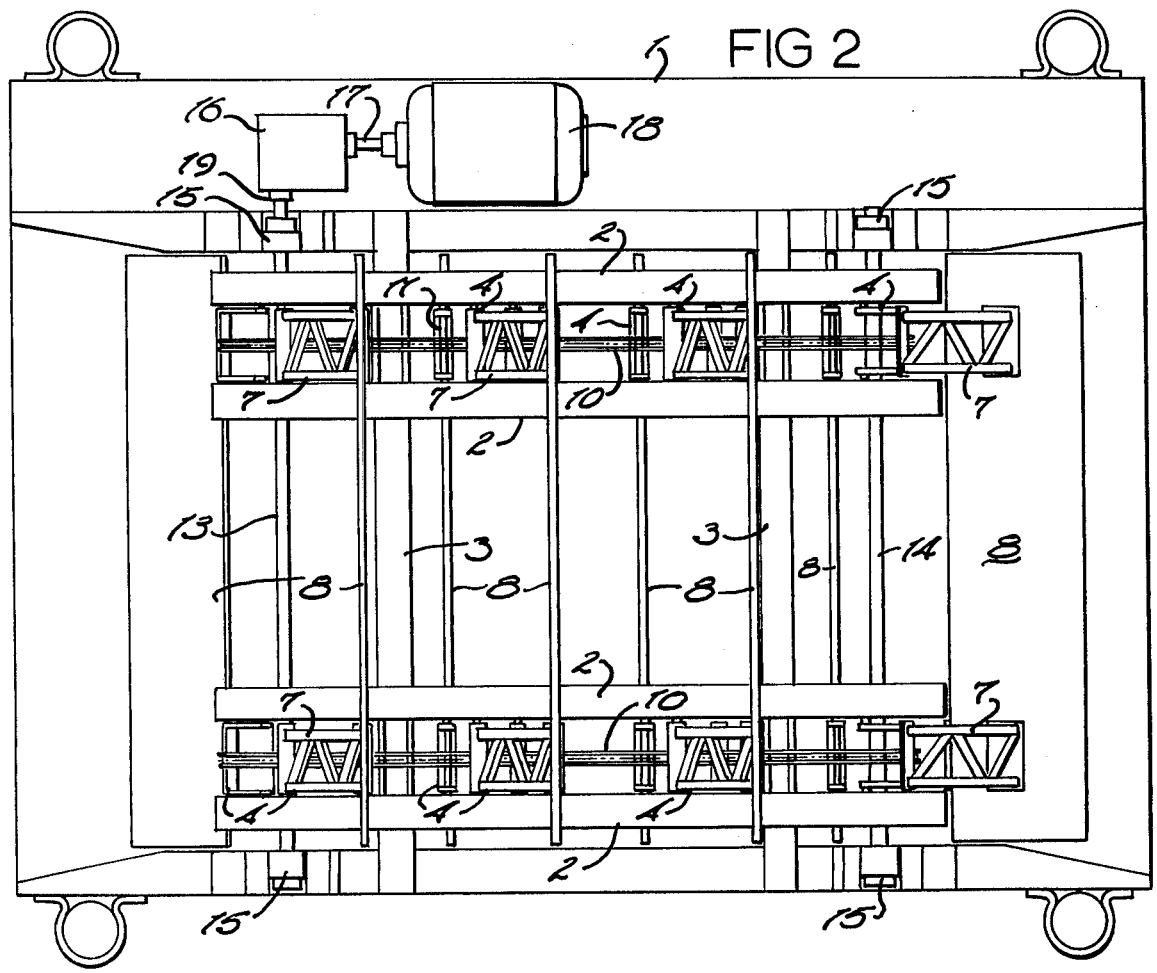
FIG. 2 is a plan view of the device.
Figure 3:
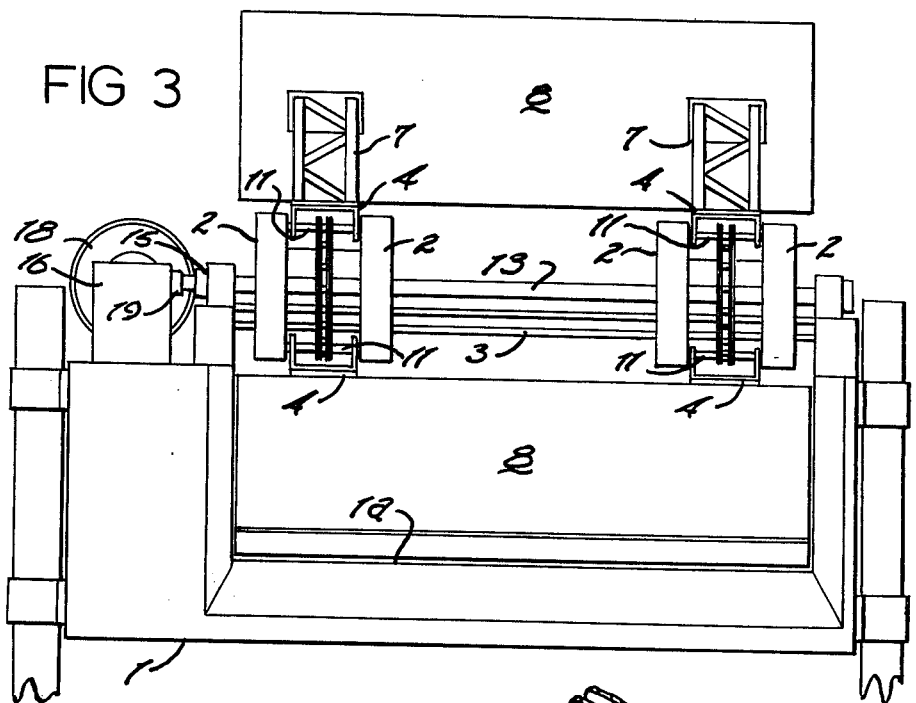
FIG. 3 is an end view of the device.
Figure 4:
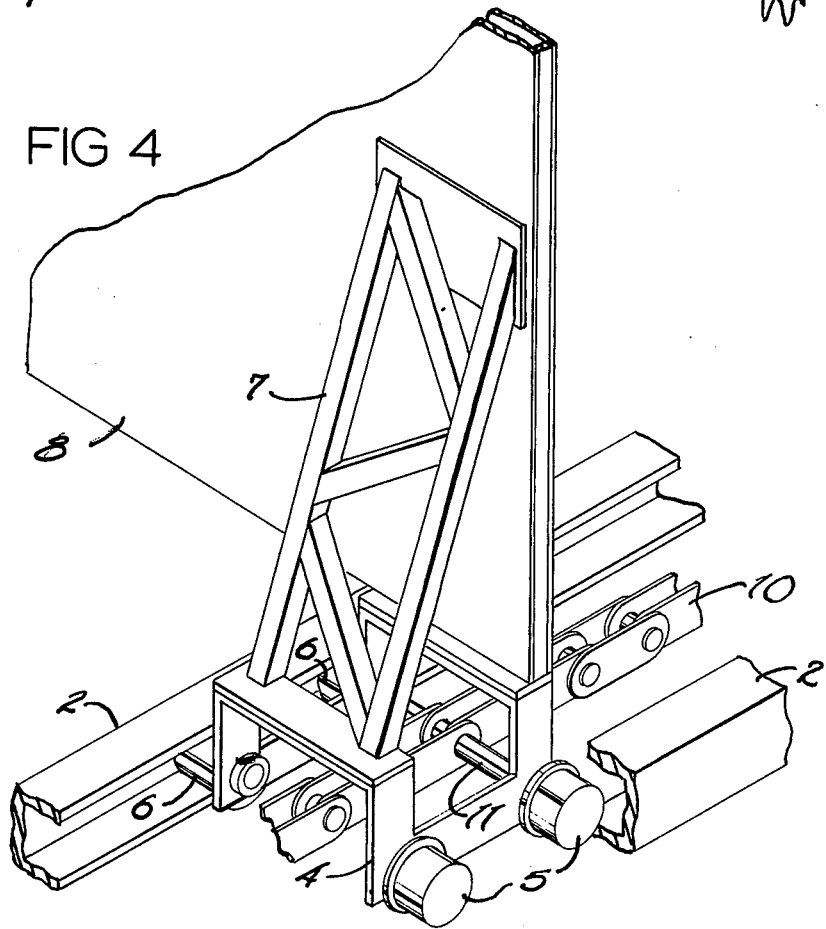
FIG. 4 is a fragmentary pictorial view showing a blade and roller frame connected to a chain and how the rollers move on the lower walls and are out of contact with the upper walls of each flight so they can roll free.
Figure 5:
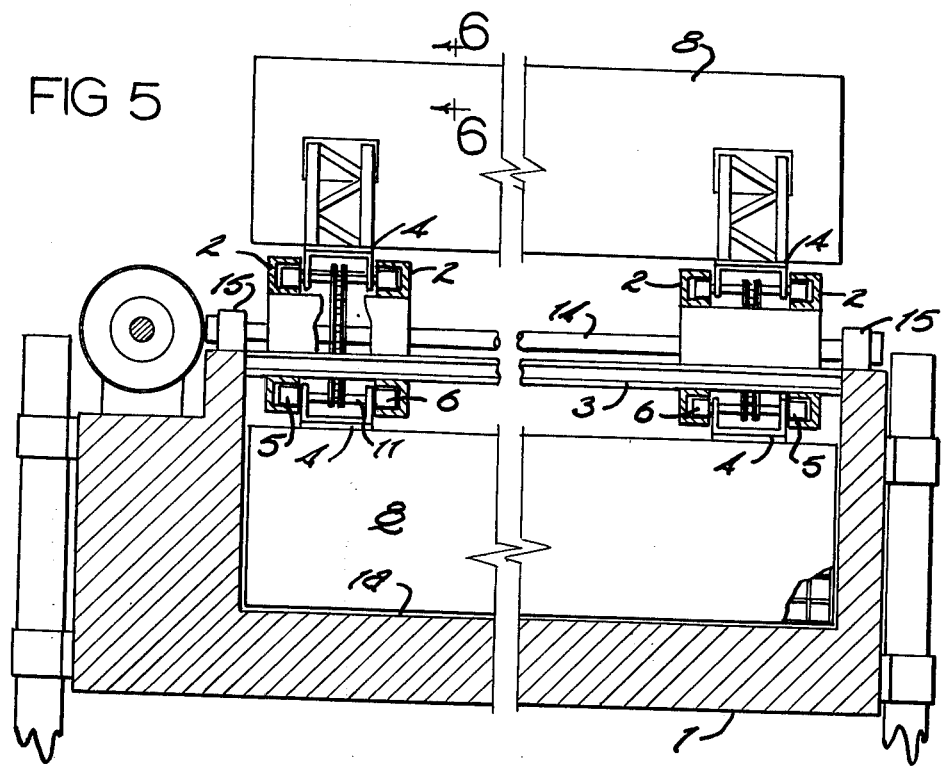
FIG. 5 is a sectional view on line 5—5 of FIG. 1.
Figure 6:
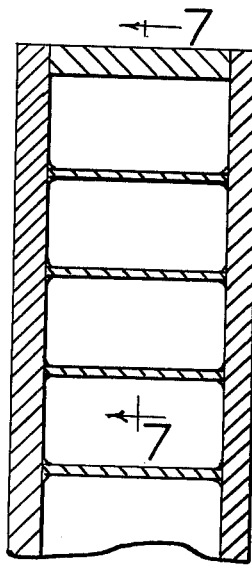
FIG. 6 is an enlarged fragmentary sectional view taken along line 6—6 of FIG. 5 showing a portion of one blade and showing the whole construction thereof.
Figure 7:
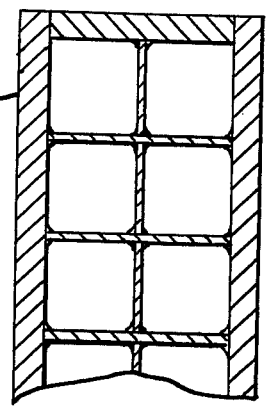
FIG. 7 is a sectional view taken along line 7—7 of FIG. 6.

Oceans tides can be utilized wherever they have a flow in one direction when rising and a flow in an opposite direction when falling. The device shown in the drawings is designed to be supported on any suitable base structure 1 that is set up across an inlet, river or bay that is affected by an ocean's tide. Since the depth of tide often varies, if should be understood that the device may be constructed in similarly varying scale to adapt to the tide height.

Referring now to the drawings in greater detail, the device is shown consisting of a plurality of pairs of tracks forming endless channel members 2. The tracks are mounted on the base support 1 by such devices as beams 3. Channel members 2 carry a plurality of roller frames 4 by means of paired rollers 5 and 6. Channel members 2 have channels formed therein that are deep enough to enable the roller pairs 5 and 6 to normally roll on the lower flange of the channel member and clear the upper flange thereof.

Each roller frame 4 has a brace arm 7 which extends diagonally upward from one end of the frame 4 to a location near the outer end of an elongated blade 8. Blades 8 are to be pushed by the flow of water through a complementary shaped channel 1a in base support 1. In order to withstand the force of tide pushing against the blade 8, the brace arms 7 may be trussed as shown in the drawings.

The length of blades 8 is variable as is the height. For long blades, more than two pair of channel members 2 must be utilized for adequate support. The depth or height of the blades 8 is governed by the total amount of rise and fall of the tide in the specific location for installation of the device so that the water will engage only the blades that are extending below channel members 2.

Each roller frame 4 is connected to an endless drive member shown as a sprocket chain 10. The roller pairs 5 and 6 are carried on axles 11 which are secured to the chain 10. The chains are engaged by sprocket wheels 12 that are affixed to a power shaft 13 and an idler shaft 14 located inside the ends of the channel members 2. Shafts 13, 14 are mounted within bearings 15 on the structure 1.

Power shaft 13 is connected to a gearing unit 16 which in turn is connected through a drive shaft 17 to a generator 18. It may be noted that an additional generator and gearing unit could also be provided to be connected to idler shaft 14.

A clutch or transmission means 19 is provided on shaft 13 that will serve to produce a single directional rotation of shaft 17 regardless of the directional rotation of power shaft 13. Thus the generator may be operated by force of both incoming and outgoing tides.

It may have become obvious from the above description and attached drawings that various modifications and changes may be made therein without departing from the intended scope of my invention. Therefore only the following claims are to be taken as definitions of my invention.

What I claim is:

1. An apparatus for producing electrical energy from directional flow of water, comprising:

a supporting base fixedly located upwardly adjacent to a moving surface of a body of water;

a pair of elongated endless rigid channel members fixed to the base in transversely spaced relationship facing one another, said channel members extending along the base parallel to the direction of movement of the water surface, each channel member having a lower flight extending along said base adjacent to the water surface and an upper flight spaced vertically above its lower flight, the lower and upper flight being interconnected by vertical arcuate end sections formed integrally therewith;

a rigid roller frame including two pairs of transversely spaced coaxial rollers, one pair of said rollers being engaged in each channel member for structural support of the roller frame and for rolling movement along the lower and upper flights are arcuate end sections thereof;

a transverse elongated blade extending outward from and substantially perpendicular to said channel members across the device in a direction transverse to the direction of movement of said water surface, said blade being fixed to the roller for movement therewith along said channel members;

a diagonal brace fixed between the roller frame and said blade;

said blade extending outward from the channel members a distance sufficient to enable it to extend downwardly into the water when supported along said lower flights and thereby being movable in response to the flow of water;

an output shaft;

endless drive means movably mounted to the base parallel to said channel members and operatively connected between said roller frame and said shaft for converting movement of said roller frame with respect to said base into rotational movement of said shaft;

electrical generating means;

and motion transmitting means operatively connecting said shaft and said electrical generating means, whereby rotational movement of said shaft energizes said electrical generating means.

2. The device set out in claim 1 wherein said motion transmitting means produces a single rotation of said electrical generating means in response to movement of said blade and roller frame regardless of the rotational direction of said shaft, enabling production of electrical energy from reversed direction of flow of the body of water.

3. The device as set out in claim 1 comprising a plurality of roller frames and blades spaced from one another along the channel members.

* * * * *